(No Model.)

F. L. DECARIE.
LEAD PIPE COUPLING.

No. 511,937. Patented Jan. 2, 1894.

Witnesses
Harry L. Ames.
D. P. Wolhaupter

Inventor
Felix Louis Decarie.
By his Attorneys,
C. A. Snow & Co.

THE NATIONAL LITHOGRAPHING COMPANY,
WASHINGTON, D. C.

UNITED STATES PATENT OFFICE.

FELIX LOUIS DECARIE, OF MONTREAL, CANADA.

LEAD-PIPE COUPLING.

SPECIFICATION forming part of Letters Patent No. 511,937, dated January 2, 1894.

Application filed June 2, 1892. Serial No. 435,283. (No model.)

*To all whom it may concern:*

Be it known that I, FELIX LOUIS DECARIE, a subject of the Queen of Great Britain, residing at Montreal, Province of Quebec, Canada, have invented a new and useful Lead-Pipe Coupling, of which the following is a specification.

This invention relates to improvements in pipe couplings; and it has for its object to provide an improved pipe coupling which is designed particularly to connect the ends of lead piping in new work and repairing, and which can also be used to connect the pipe ends of electric wire cables in splicing the same as will be at once apparent to those skilled in the art.

To this end the invention contemplates primarily the construction of a lead pipe coupling which provides a perfectly firm and tight connection which cannot possibly become displaced.

With these and many other objects in view which will readily appear as the nature of the invention is better understood, the same consists in the novel construction, combination and arrangement of parts hereinafter more fully described, illustrated and claimed.

Figure 1:
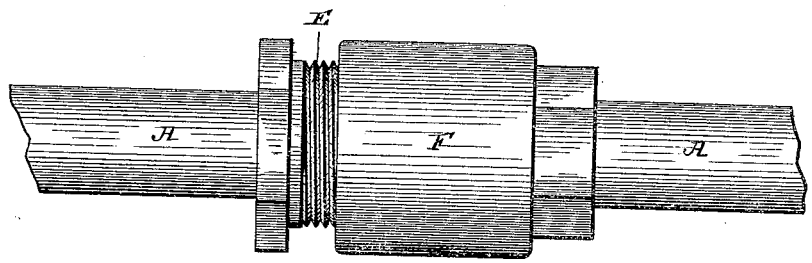
Figure 2:
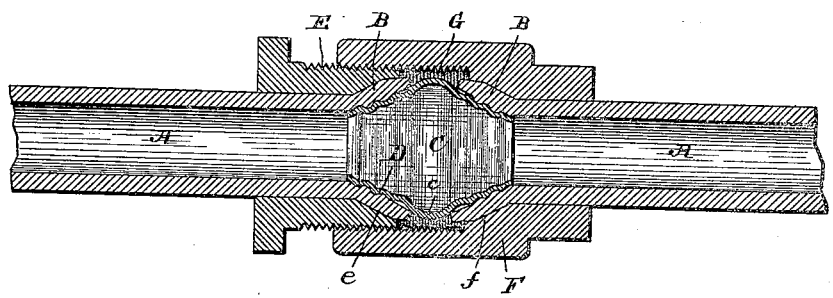
Figure 3:
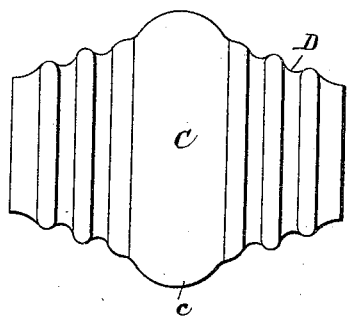

In the accompanying drawings:—Figure 1 is an elevation of a pipe coupling constructed in accordance with this invention. Fig. 2 is a sectional view of the same. Fig. 3 is a detail side elevation of the intermediate coupling thimble.

Referring to the accompanying drawings:—A, A represent opposite lead pipe sections which are adapted to have their ends coupled together to form a secure and tight pipe, such pipe sections being either ordinary distributing pipes or the inclosing lead covers of electric wire cables, which after being spliced can have their inclosing covers coupled by the same means herein described for coupling ordinary sections of pipe. The ends of each of the pipe sections A are flared as at B, by any suitable tools, so as to receive the tapered ends of the double cone coupling thimble C, placed intermediate of the opposing ends of the opposite pipe sections to be coupled together. The said thimble C is provided on each tapered end thereof, tapering from the raised central rounded knob or base c, with a series of annular coupling corrugations D, which form a uniform broken face, into which the flared ends of the pipe sections are pressed evenly, around their entire peripheries, so as to effectually clamp the pipe ends to the same coupling thimble, so that a perfectly tight and secure joint is formed. The corrugations D comprise a regular series of symmetrically rounded ridges and furrows or grooves, as illustrated. This construction allows the lead of the pipe to be alternately indented by the rounded ridges and forced into the rounded furrows or grooves to secure a perfectly tight joint, without cutting the pipe at any portion and thus impairing the joint. Loosely mounted upon one of the pipe sections adjacent to the flared end thereof is the sleeve bush E having an inner beveled end e, working over the outside of the flared end of the pipe section upon which the same is mounted. Upon the corresponding and opposite pipe section is loosely mounted the clamping coupling collar F, also provided with an inner beveled portion f, working over the flared end of the section upon which it is mounted, and with the extended interiorly threaded neck G extending over the intermediate coupling thimble and engaging the opposite sleeve bush E so that the said collar and bush are drawn toward each other to firmly press the flared ends into the grooves of the coupling thimble. It is apparent that the raised rounded knob or base C, forms a shoulder or stop for the ends of the pipe to force the same down into the furrow or groove nearest said knob or base.

It will be readily seen from the foregoing that a coupling is provided which while simple in construction yet attains all the ends for which such couplings are designed.

A point of importance to note with respect to the coupling herein described, is that the ends of the pipe, to be coupled, are previously tapered in order that the pipe will not be weakened by expanding the ends thereof at the time of coupling, which is an apparent fault in similar couplings. It may be well therefore to observe at this point the specific manner in which the parts of the coupling cooperate to produce the novel coupling claimed by me. In the first place, the pipes to be coupled together are inserted through the union nut, or at least the sleeve E, and the collar F, herein referred to, and then by means of a suitable tool, having a taper corresponding to that of the coupling thimble, the ends of the lead pipes are expanded sufficiently so that the thimble can be dropped into position as far as its rounded base or hub C, which not only forms a stop but permits both ends of pipe to occupy the same relative position on the thimble. Now, as the coupling sleeve and collar are screwed together at the same time, the pressure on the lead pipes is equalized, so that both ends are made of a uniform thickness and are evenly contracted against the thimble. The central base or hub C, being the highest point of the thimble, prevents the pipe from spreading, while the rolling motion, acquired in screwing the couplings together, compresses the lead into the corrugations of the thimble and forms a packing ring of lead so as to hold the pipe, preventing it from moving forward or backward. It is to be observed at this point that by reason of the rounded corrugations, a rolling motion is secured in screwing the coupling sections together so as to contract the lead against the thimble instead of expanding it.

Having thus described my invention, what I claim, and desire to secure by Letters Patent, is—

In a lead pipe coupling, the combination of opposite lead pipe sections having previously flared ends, an intermediate double cone coupling thimble provided with a raised central rounded base or hub of a diameter equal to or greater than the exterior diameter of the flared ends of the pipe, and a uniform or regular series of annular coupling corrugations in the tapered ends thereof, said corrugations comprising a regular series of symmetrically rounded ridges and furrows adapted to receive an even distribution of the metal of the flared ends of the pipes as the same are rolled thereon, an exteriorly threaded sleeve bush having an inner beveled end working over the flared end of one of the pipe sections, and an oppositely interiorly threaded coupling collar, having an inner beveled portion or shoulder working over the flared ends of the other pipe sections, said sleeve and said collar being adapted to be simultaneously screwed together, substantially as set forth.

In testimony that I claim the foregoing as my own I have hereto affixed my signature in the presence of two witnesses.

FELIX LOUIS DECARIE.

Witnesses:
JNO. H. SIGGERS,
BERNICE A. WOOD.